United States Patent
Deng et al.

(10) Patent No.: US 11,725,925 B1
(45) Date of Patent: Aug. 15, 2023

(54) HIGH-TEMPERATURE SUPERCONDUCTING (HTS) MAGNETIC LEVITATION (MAGLEV) DEWAR CAPABLE OF INCREASING DAMPING AND LEVITATION FORCE AND WIDTH CALCULATING METHOD THEREOF

(71) Applicant: Southwest Jiaotong University, Chengdu (CN)

(72) Inventors: Zigang Deng, Chengdu (CN); Xucheng Zhou, Chengdu (CN); Xueli Li, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/179,022

(22) Filed: Mar. 6, 2023

(30) Foreign Application Priority Data

Jun. 23, 2022 (CN) .......................... 202210717648.5

(51) Int. Cl.
  *G01B 7/02* (2006.01)
  *H02N 15/00* (2006.01)
  *H01F 6/04* (2006.01)
  *H01F 6/00* (2006.01)
  *H01F 7/02* (2006.01)

(52) U.S. Cl.
  CPC ................. *G01B 7/02* (2013.01); *H01F 6/04* (2013.01); *H02N 15/00* (2013.01); *H01F 6/00* (2013.01); *H01F 7/0236* (2013.01)

(58) Field of Classification Search
  USPC .......................................... 702/170
  See application file for complete search history.

(56) References Cited

U.S. PATENT DOCUMENTS

| | | | | |
|---|---|---|---|---|
| 5,334,965 | A | * | 8/1994 | Dolgin .................... F16F 15/03 335/216 |
| 5,442,928 | A | | 8/1995 | Laskaris et al. |
| 6,411,187 | B1 | * | 6/2002 | Rotem ............... G01R 33/3806 335/298 |
| 2002/0024338 | A1 | * | 2/2002 | Saho .................. G01R 33/0354 505/100 |
| 2008/0278270 | A1 | * | 11/2008 | Hull ...................... F16C 37/005 310/90.5 |

FOREIGN PATENT DOCUMENTS

| CN | 103322117 A | 9/2013 |
|---|---|---|
| CN | 106653281 A | 5/2017 |
| CN | 107120522 A | 9/2017 |
| CN | 107941280 A | 4/2018 |
| CN | 207352144 U | 5/2018 |

(Continued)

*Primary Examiner* — Paul D Lee

(57) ABSTRACT

A high-temperature superconducting (HTS) magnetic levitation (maglev) Dewar capable of increasing damping and levitation force and a width calculation method thereof. The HTS maglev Dewar includes an outer container and an inner container. The outer container is fixedly connected to the inner container through a connecting column. The inner container has a cavity configured to accommodate liquid nitrogen. A bottom of the inner container is provided with a bulk superconductor. The inner container is communicated with outside through a liquid nitrogen feeding pipe. The outer container is made of an electrically conductive material.

9 Claims, 2 Drawing Sheets

(56) References Cited

FOREIGN PATENT DOCUMENTS

| | | | |
|---|---|---|---|
| CN | 109003774 | A | 12/2018 |
| CN | 109141575 | A | 1/2019 |
| CN | 210227592 | U | 4/2020 |
| CN | 112196927 | A | 1/2021 |
| CN | 112259319 | A | 1/2021 |
| CN | 113035486 | A | 6/2021 |
| CN | 113053613 | A | 6/2021 |
| CN | 113096908 | A | 7/2021 |
| CN | 215069486 | U | 12/2021 |

\* cited by examiner

HIGH-TEMPERATURE SUPERCONDUCTING (HTS) MAGNETIC LEVITATION (MAGLEV) DEWAR CAPABLE OF INCREASING DAMPING AND LEVITATION FORCE AND WIDTH CALCULATING METHOD THEREOF

CROSS-REFERENCE TO RELATED APPLICATIONS

This application claims the benefit of priority from Chinese Patent Application No. 202210717648.5, filed on Jun. 23, 2022. The content of the aforementioned application, including any intervening amendments thereto, is incorporated herein by reference in its entirety.

TECHNICAL FIELD

The present application relates to high-temperature superconducting (HTS) pinning magnetic levitation (maglev), and more particularly to a high-temperature superconducting (HTS) maglev Dewar capable of increasing damping and levitation force and a width calculating method thereof.

BACKGROUND

High-temperature superconductors (HTS) have a higher critical temperature (higher than 77 K) than other ordinary superconducting materials, and can reach a superconducting state at a boiling point of liquid nitrogen. The HTS pinning maglev system provides levitation force to trains based on the flux-pining effect of the HTS. Unfortunately, the damping of the bulk superconductor material in the HTS pinning maglev system is too small to effectively suppress the system vibration. Therefore, it is urgently needed to improve damping and levitation force of the HTS pinning maglev system.

SUMMARY

In order to overcome the problems in the prior art, the present disclosure provides a Dewar capable of increasing damping and levitation force of high-temperature superconducting maglev and a width calculation method thereof.

Technical solutions of the disclosure are described as follows.

In a first aspect, the present disclosure provides a high-temperature superconducting (HTS) maglev Dewar capable of increasing damping and levitation force, comprising:
an outer container; and
an inner container;
wherein the inner container is provided in the outer container, and is fixedly connected to the outer container through a connecting column; the inner container has a cavity configured to accommodate liquid nitrogen; a bottom of the inner container is provided with a bulk superconductor; the inner container is communicated with outside through a liquid nitrogen feeding pipe; and the outer container is made of an electrically conductive material.

In a second aspect, the present disclosure provides a method for calculating a width of the above-mentioned HTS maglev Dewar, comprising:
acquiring parameter information of a permanent magnet rail;
performing static magnetic field distribution calculation according to the parameter information by using a finite element analysis software to obtain a simulation result;
acquiring, according to the simulation result, a magnetic field distribution state of the permanent magnet rail on a cross section; and
calculating a width of the HTS maglev Dewar according to the magnetic field distribution state and a preset magnetic field gradient range.

Compared to the prior art, this application has the following beneficial effects.

Regarding the HTS maglev Dewar provided herein, the outer container, which is closest to the permanent magnet rail, and has a large magnetic field gradient and the largest area directly opposite to the permanent magnet rail, plays a role in increasing the system damping. Therefore, compared to the prior art where the stainless steel material is employed to improve the damping, this application can improve the system damping without any structural changes.

Other features and advantages of the present disclosure will be described below, or are understood based on the embodiments of the present disclosure. The objects and other advantages of the present disclosure may be realized and obtained by means of the structure specially indicated in the description, claims and drawings.

BRIEF DESCRIPTION OF THE DRAWINGS

The drawings needed in the description of embodiments of the disclosure will be briefly described below to explain the technical solutions of the present disclosure more clearly. Obviously, presented in the accompany drawings are merely some embodiments of the present disclosure, and other drawings can be obtained by those skilled in the art based on the drawings provided herein without paying creative effort.

Figure 1:
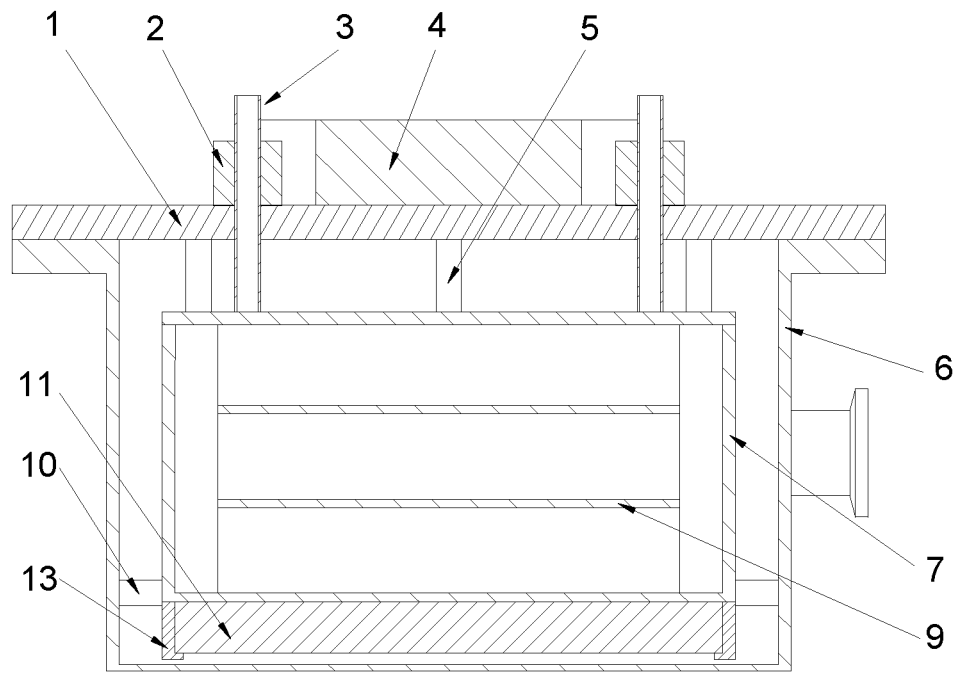
FIG. 1 is a sectional view of a high-temperature superconducting (HTS) maglev Dewar according to Embodiment 1 of the present disclosure along a width direction.

In the drawings, 1, cover; 2, corrugated pipe; 3, liquid nitrogen feeding pipe; 4, mounting base; 5, connecting column; 6, outer container; 7, inner container; 9, baffle; 10, positioning column; 11, bulk superconductor; 12, permanent magnet rail; 13, enclosed frame; 31, first pipe portion; 32, second pipe portion; and 33, third pipe portion.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure, which are not intended to limit the disclosure. The components described and illustrated in the drawings can be arranged and designed in various configurations. Therefore, the embodiments provided in the accompanying drawings are merely illustrative, and are not intended to limit the scope of the present disclosure. Based on the embodiments of the present disclosure, all other embodiments obtained by those skilled in the art without paying any creative effort shall fall within the scope of the present disclosure.

It should be noted that similar reference numerals or letters indicate similar elements in the following drawings. Therefore, once a certain element has been defined in one drawing, it does not need to further define and explain such element in subsequent drawings. As used herein, the terms "first", "second", etc. are only used to distinguish the elements referred to, and cannot be understood as indicating or implying relative importance.

The superconductor employed in a HTS pinning maglev system is a bulk non-ideal type II superconductor, which has a third state, namely mixed state, in addition to the superconducting and normal states. In the mixed state, the superconductor can pin the flux lines passing therethrough to block changes of the external magnetic field, In this case, both repulsive and attractive forces can be generated, achieving the stable levitation of the HTS pinning maglev system.

Due to a flux-pining effect of HTS, a bulk superconductor 11 and a permanent magnet rail 12 generate a non-source self-stabilization pining force, such that the HTS pinning maglev system provides a levitation force in the vertical direction and a guiding force in the lateral direction to a maglev train. The HTS has a strong nonlinear electromagnetic constitutive relation, which determines that a force on the HTS above the permanent magnet rail 12 has a strong nonlinearity, leading to a hysteretic nonlinear magnet-rail relationship in maglev applications. The magnet-rail relationship is dependent on material properties. When the HTS pinning maglev system vibrates, due to the alternating current (AC) loss and flux motion inside the superconductor, the hysteresis in the magnet-rail relationship plays a damping role in the vibration of the bulk superconductor 11, where an equivalent damping is small. From the view of vibration system, the HTS pinning maglev system, the HTS pinning maglev system is a light-damping system. When the HTS pinning maglev system applies in trains, damping of the trains may fail to suppress the violent vibration of the HTS pinning maglev system when a speed and vibration increase, or even the vibration instability may occur, affecting the safety of the HTS pinning maglev system.

Embodiment 1

Figure 2:
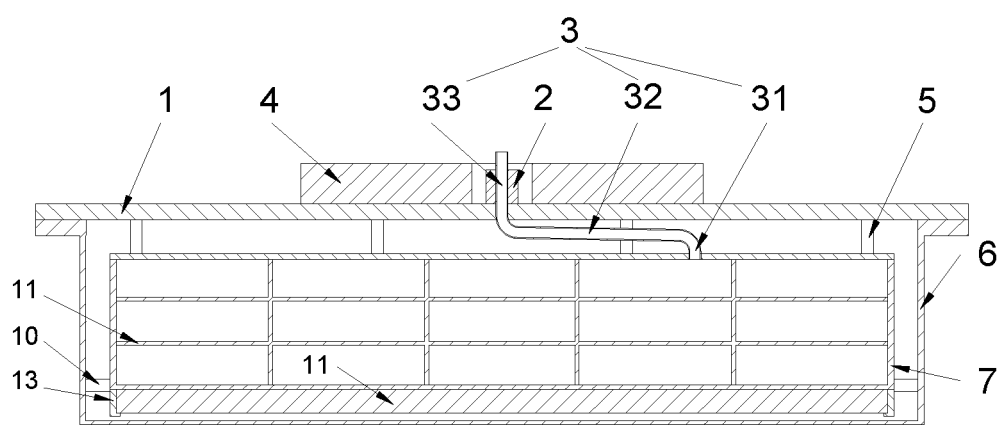
FIG. 2 is a sectional view of the HTS maglev Dewar according to Embodiment 1 of the present disclosure along a length direction.

Referring to FIGS. 1-2, provided is a HTS maglev Dewar capable of increasing damping and levitation force.

As shown in FIG. 1, the HTS maglev Dewar includes an outer container 6 and an inner container 7. The inner container 7 is provided inside the outer container 6, and is fixedly connected to the outer container 6 through a connecting column 5. The inner container 7 has a cavity configured to accommodate liquid nitrogen. A bottom of the inner container 7 is provided with a bulk superconductor 11. The inner container 7 is communicated with outside through a liquid nitrogen feeding pipe 3. The outer container 6 is made of an electrically conductive material. The outer container 6 is configured to generate damping. When the HTS pinning maglev system moves in the vertical direction, the outer container 6 made of an aluminum alloy can induce an eddy current and generate an ohmic loss to consume an energy of vibration. In an embodiment, the electrically conductive material is a material with high electrical conductivity, such that there is a correlation between a braking force and a motion speed of different materials moving in the same magnetic field, and the braking force is non-linearly related to speed. At a low speed, the braking force increases with the rise of the speed. When the speed reaches a preset speed, the braking force is maximized. Then, the braking force decreases with the increase of the speed and will be stable at a value. A speed when the braking force is maximized is determined as a saturation speed of material. Materials with high conductivity have a low saturation speed, but can produce greater braking force at low speed. Considering that the vibration speed in this embodiment is generally low, the materials with high conductivity can lead to a greater damping. Specifically, the conductivity is greater than $2.3 \times 10^7$ S/m. Further, the outer container 6 is made of 7050-T7451 aluminum alloy because of its high conductivity ($2.4 \times 10^7$ S/m), great mechanical property and low cost.

Figure 3:
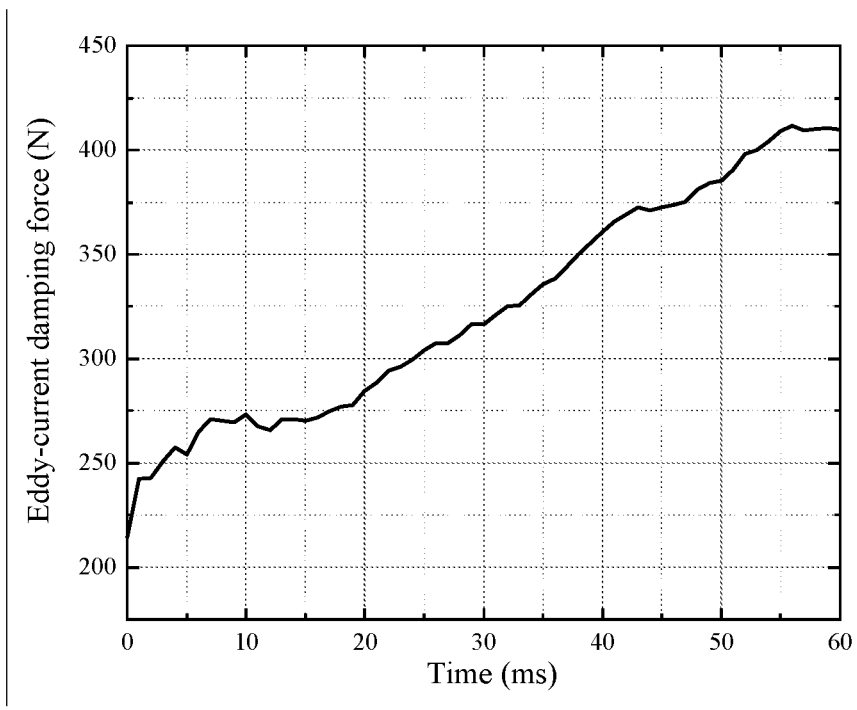
FIG. 3 shows a variation of a damping force on an outer container with time according to an embodiment of the present disclosure.

Regarding the HTS maglev Dewar provided herein, the outer container, which is closest to the permanent magnet rail 12, has a large magnetic field gradient and has the largest area directly opposite to the permanent magnet rail 12, is employed as equipment for increasing damping, such that the damping of the HTS pinning maglev system can be improved without any change comparing to the prior art using stainless steel material. In addition, the outer container 6 made of 7050-T7451 aluminum alloy will affect an interaction between the bulk superconductor 11 and the permanent magnet rail 12. Also, since no additional equipment has been introduced, no need for additional calculation of a weight of dampers when designing the bulk superconductor 11 and the permanent magnet rail 12. The material with high conductivity is suitable for the HTS pinning maglev system since it has low speed, small displacement and high frequency during vibration. The material with high conductivity has a low saturation speed and a large equivalent damping at low speed, thus can provide great resistance to suppress vibration at low speed. It breaks through a limitation of small self-damping of superconductor and increases the damping of the HTS pinning maglev system, improving a dynamic performance of the HTS pinning maglev system. During the motion at the vertical direction, the outer container 6 made of aluminum alloy can induce an eddy current and generate an ohmic loss to consume an energy of vibration. A variation of a damping force on the outer container 3 with time is shown in FIG. 3, where the outer container 6 dropped off at 0.15 m/s. It can be observed that the outer container 6 can provide additional eddy-current damping of more than 400 N for the HTS pinning maglev system. Moreover, the smaller the distance between the outer container and the permanent magnet rail 12 is, the larger the damping force is, leading to an expected damping effect.

In order to further utilize the magnetic field of the permanent magnet rail 12 to generate a damping force, a width of the outer container 6 is greater than a width of the permanent magnet rail 12.

In an embodiment, in order to reduce a heat exchange between the liquid nitrogen in the inner container 7 and outside, the outer container 6 includes a damper. The damper has a cavity structure. The damper is provided with a first opening. A cover 1 fitting the first opening is arranged at the first opening. The outer container 6 is connected to the cover 1 through a bolt. The inner container 7 is arranged in a cavity enclosed by the damper and the cover 1. A gap is provided between the inner container and an inner wall of the outer container 6. The gap is vacuumized through a vacuum pump to form a vacuum insulation layer. By constructing the gap, a vacuum protective layer is constructed between the inner container 7 and the outer container 6 to reduce the heat exchange between the liquid nitrogen and outside.

In an embodiment, the cover 1 is made of stainless steel while prior art uses high strength polymer materials. By means of the excellent welding performance of the stainless steel, the assembly of the cover 2 with a corrugated pipe 2 and a mounting base can be simplified. This application uses welding instead of bonding, which improves connection reliability and air impermeability, and reduces the failure frequency.

In order to further reduce the heat exchange between the liquid nitrogen and outside, a top of the inner container 7 is fixedly connected to the cover 1 through a connecting column 5. Specifically, the connecting column 5 is made of G10 fiber reinforced plastic (FRP). By means of the connecting column 5, the cover 1 and the connecting column 5 has an indirect contact. The G10 FRP, as a high thermal resistance material, can effectively increase the heat resistance between the inner container 7 and the cover 1, and reduce the heat conduction, which further improves the thermal insulation, reduces the consumption rate of liquid nitrogen and prolongs the working time of the HTS maglev Dewar, leading to a better economic efficiency.

Referring to FIG. 2, the liquid nitrogen feeding pipe 3 is a curved pipe. Specifically, the liquid nitrogen feeding pipe 3 includes a first pipe portion 31, a second pipe portion 32 and a third pipe portion 33. A first end of the first pipe portion 31 is connected to the cavity of the inner container 7. A second end of the first pipe portion 31 is connected to a first end of the second pipe portion 32. A second end of the second pipe portion 32, which is away from the first pipe portion 31, is communicated with outside. Specifically, the second end of the second pipe portion 32 is communicated with outside through the third pipe portion 33. In this embodiment, a joint between the second pipe portion 32 and the first pipe portion 31 is curved. The second pipe portion 32 is arranged obliquely. A height of the joint between the second pipe portion 32 and the first pipe portion 31 is lower than a height of a joint between the second pipe portion 32 and the third pipe portion 33, so as to prevent liquid nitrogen feeding pipe 3 from residual of liquid nitrogen when adds the liquid nitrogen. The liquid nitrogen feeding pipe 3 is curved rather than straight, which not only increases heat resistance, but also prevents the loss caused by the splashing of the liquid nitrogen from the liquid nitrogen feeding pipe during vibration the HTS maglev Dewar.

Referring to FIGS. 1-2, a baffle 9 is arranged inside the inner container 7. When the HTS maglev Dewar vibrates, the liquid nitrogen may shake strongly, which is not conducive to a fully contact between the liquid nitrogen and the inner container 7, and affects a cooling effect of the HTS and generates an impact load on the inner container 7. In order to suppress the shaking of the liquid nitrogen, inside the inner container 7 is provided with the baffle 9, such that the liquid nitrogen can fully contact with the inner container 7, ensuring a steady heat transfer and a stable superconductor state. In addition, an internal inertial impact and liquid nitrogen loss are reduced.

Referring to FIGS. 1-2, the HTS maglev Dewar further includes enclosed frame 13 with an inverted "7"-shaped cross section. A top of the enclosed frame 13 is welded to a bottom of the inner container 7. The enclosed frame 13 and the bottom of the inner container 7 together form a fixing groove. The fixing groove is configured to accommodate the bulk superconductor 11. An opening of the fixing groove faces towards the permanent magnet rail. A horizontal portion of the enclosed frame 13 within a region of the fixing groove is configured as a load-bearing platform. Specifically, the welding is spot welding. It should be understood that the bottom of the inner container 7 accommodates at least one bulk superconductor 11 through the fixing groove during use. In an embodiment, multiple bulk superconductors 11 are accommodated in the fixing groove, and the bulk superconductors 11 are in a 2×12 double-row longitudinal arrangement with a seed crystal surface facing downward. The seed crystal surface is a starting surface for growth of the bulk superconductor 11, which has more regular microstructure, better performance and greater levitation force density. The arrangement of seed crystal surface facing downward can provide a greater levitation force when the HTS pinning maglev system is in suspension state. Preferably, the bulk superconductors 11 are cuboid. A short side of the bulk superconductors 11 is arranged longitudinally in two rows along a length of the inner container 7, which facilitates the mounting of the bulk superconductors 11 and the inner container 7, as shown in FIGS. 1-2. In addition, after mounting the bulk superconductors 11, around the top of the enclosed frame 13 are performed spot welding. When a welding point of the enclosed frame 13 is deformed, the bulk superconductor 11 wrapped by the enclosed frame 13 is extruded to fix the bulk superconductor 11 at the bottom of the inner container 7. The bulk superconductor 11 is such closely attached to the bottom of the inner container 7 that cannot move. In consequence, the bulk superconductor 11 can be mounted reliably. In addition, this mounting method is different from threaded connection as usual, which prevents the bulk superconductor 11 from measures that may causing loss, such as drilling, ensures an integrity of the bulk superconductor 11 and increases an effective area of the bulk superconductor 11, thereby improving the levitation force. This mounting method increases the levitation force of the HTS maglev Dewar by about 2.5% compared to threaded connection.

In an embodiment, in order to increase structural stiffness, a positioning column 10 is provided between a side wall of the inner container 7 and a side wall of the outer container 6 to increase structural stiffness and positioning stiffness, which prevents the inner container 7 from being greatly deformed under stress, and ensures the reliability of structural connection. The positioning column 10 is made of polymer material such as G10 FRP, which has large thermal resistance and will not affect the thermal insulation of the HTS maglev Dewar.

Referring to FIGS. 1-2, the HTS maglev Dewar further includes a corrugated pipe 2 and a mounting base 4. One end of the corrugated pipe 2 is welded with the cover 1. The liquid nitrogen feeding pipe 3 is communicated with outside by passing through the corrugated pipe 2. The mounting base 4 is welded with the cover 1. A threaded hole is provided at a top of the mounting base 4, such that the HTS maglev Dewar can be mounted at a desired position.

Embodiment 2

Provided is a method for calculating a width of the HTS maglev Dewar of Embodiment 1, including the following steps.

(S10) Parameter information of the permanent magnet rail 12 is acquired.

Specifically, the parameter information includes a width, length, height and magnetization intensity of a permanent magnet, and a width of the permanent magnet rail 12.

(S20) Static field distribution calculation is performed on the parameter information by using a finite element analysis software to obtain a simulation result.

Figure 4:
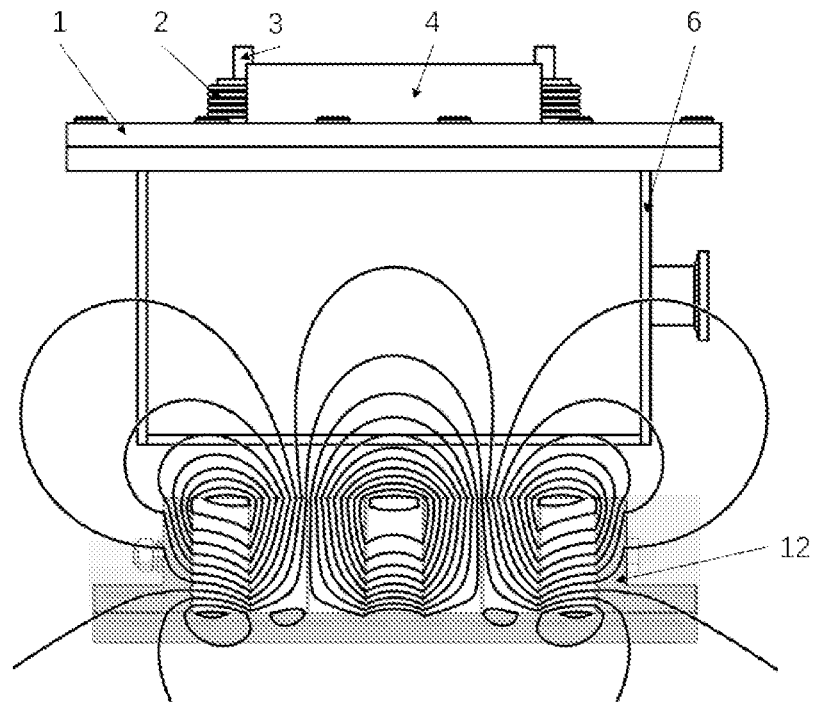
FIG. 4 schematically shows a distribution of magnetic induction lines of a permanent magnet rail according to an embodiment of the present disclosure.

Specifically, the finite element analysis is ANASYS Maxwell finite element software. The simulation result is shown in FIG. 4.

(S30) A magnetic field distribution state of the permanent magnet rail on a cross section of the permanent magnet rail is acquired according to the simulation result.

(S40) A width of the outer container (i.e., the damper) of the HTS maglev Dewar is calculated according to the magnetic field distribution state and a preset magnetic field gradient range.

Step (S40) includes the following steps.

(S41) A magnetic flux density distribution on a horizontal plane under the magnetic field distribution state is extracted. The horizontal plane is a top surface of the permanent magnet rail 12.

(S42) An intersection between a centerline of the cross section of the permanent magnet rail 12 and the top surface of the permanent magnet rail 12 is taken as a zero point. Two first positions with a magnetic flux density equal to a first threshold are extracted under the magnetic flux density distribution.

The object of the step (S42) is to extract a critical position with the first threshold as a boundary according to the magnetic flux density distribution of the permanent magnet rail 12 in the horizontal direction. The first threshold is 0.1. A transverse magnetic flux density of a region greater than the first threshold may provide an eddy-current damping during vertical vibration of Embodiment 1.

(S43) Two second positions are extracted under the magnetic field distribution with the two first positions as a boundary, in which a magnetic flux density gradient of the two second positions is larger than a second threshold. A distance between the two second positions is taken as the width of the outer container (i.e., the damper).

The object of the step (S43) is to optimize the width of the HTS maglev Dewar of Embodiment 1, that is, within a width range defined by the first threshold, a region with a gradient difference of more than 0.002 T/mm is taken as the width of the HTS maglev Dewar of Embodiment 1, that is, the second threshold is 0.002.

Described above are merely preferred embodiments of this disclosure, which are not intended to limit the scope of the present disclosure. Any changes, modifications and replacements made by those killed in the art without departing from the spirit of this disclosure should fall within the scope of the present disclosure defined by the appended claims.

Although some embodiments of the present disclosure have been illustrated above, various replacement and variations to these embodiments can be made by those skilled in the art without departing from the principle and spirit of the present disclosure. The scope of the present disclosure is defined solely by the appended claims or equivalents thereof.

What is claimed is:

1. A method for calculating a width of a high-temperature superconducting (HTS) magnetic levitation (maglev) Dewar capable of increasing damping and levitation force, comprising:
   (a) acquiring parameter information of a permanent magnet rail;
   (b) performing static magnetic field distribution calculation according to the parameter information by using a finite element analysis software to obtain a simulation result;
   (c) acquiring, according to the simulation result, a magnetic field distribution state of the permanent magnet rail on a cross section of the permanent magnet rail; and
   (d) calculating a width of an outer container of the HTS maglev Dewar according to the magnetic field distribution state and a preset magnetic field gradient range;
   wherein the HTS maglev Dewar comprises the outer container and an inner container; the inner container is provided inside the outer container, and is fixedly connected to the outer container through a connecting column; the inner container has a cavity configured to accommodate liquid nitrogen; a bottom of the inner container is provided with a bulk superconductor; the inner container is communicated with outside through a liquid nitrogen feeding pipe; and the outer container is made of an electrically conductive material.

2. The method of claim 1, wherein the outer container comprises a damper; the damper has a cavity structure; the damper is provided with a first opening; a cover fitting the first opening is arranged at the first opening; the inner container is arranged in a cavity enclosed by the damper and the cover; and a gap is provided between the inner container and an inner wall of the outer container.

3. The method of claim 2, wherein the damper is made of an aluminum alloy; and the cover is made of stainless steel.

4. The method of claim 2, wherein a top of the inner container is fixedly connected to the cover through the connecting column.

5. The method of claim 1, wherein the width of the outer container is greater than a width of the permanent magnet rail.

6. The method of claim 1, wherein the liquid nitrogen feeding pipe comprises a first pipe portion and a second pipe portion; a first end of the first pipe portion is connected to the cavity of the inner container; a second end of the first pipe portion is connected to a first end of the second pipe portion; a second end of the second pipe portion is communicated with outside; and a joint between the second pipe portion and the first pipe portion is curved.

7. The method of claim 1, wherein a baffle is arranged inside the inner container.

8. The method of claim 1, wherein the HTS maglev Dewar further comprises an enclosed frame with an inverted "7"-shaped cross section; a top of the enclosed frame is welded to the bottom of the inner container; the enclosed frame and the bottom of the inner container together form a fixing groove; the fixing groove is configured to accommodate the bulk superconductor; an opening of the fixing groove faces towards the permanent magnet rail; and a horizontal portion of the enclosed frame within a region of the fixing groove is configured as a load-bearing platform.

9. The method of claim 1, wherein step (d) comprises:
   extracting a magnetic flux density distribution on a horizontal plane; wherein the horizontal plane is a top surface of the permanent magnet rail;
   taking an intersection between a centerline of the cross section of the permanent magnet rail and the top surface of the permanent magnet rail as a zero point; and
   extracting two first positions with a magnetic flux density equal to a first preset threshold under the magnetic flux density distribution; and
   extracting two second positions under the magnetic field distribution state with the two first positions as a boundary, wherein a magnetic flux density gradient at the two second positions is larger than a second preset threshold; and a distance between the two second positions is taken as the width of the outer container.

* * * * *